(12) United States Patent
Obayashi et al.

(10) Patent No.: US 9,441,723 B2
(45) Date of Patent: Sep. 13, 2016

(54) STEEL GEAR AND MANUFACTURING METHOD FOR THE SAME

(75) Inventors: Koji Obayashi, Anjo (JP); Keita Taguchi, Anjo (JP); Yasutaka Miyake, Anjo (JP); Takaaki Ogiso, Anjo (JP)

(73) Assignee: AISIN AW CO., LTD., Aichi-ken (JP)

( * ) Notice: Subject to any disclaimer, the term of this patent is extended or adjusted under 35 U.S.C. 154(b) by 331 days.

(21) Appl. No.: 13/984,097

(22) PCT Filed: Mar. 1, 2012

(86) PCT No.: PCT/JP2012/055155
§ 371 (c)(1),
(2), (4) Date: Aug. 7, 2013

(87) PCT Pub. No.: WO2012/132743
PCT Pub. Date: Oct. 4, 2012

(65) Prior Publication Data
US 2013/0319154 A1 Dec. 5, 2013

(30) Foreign Application Priority Data

Mar. 31, 2011 (JP) ................................. 2011-077747

(51) Int. Cl.
*F16H 55/17* (2006.01)
*F16H 55/06* (2006.01)
(Continued)

(52) U.S. Cl.
CPC ................. *F16H 55/06* (2013.01); *C21D 1/10* (2013.01);
(Continued)

(58) Field of Classification Search
CPC .......... C22C 1/02; C22C 38/02; C22C 38/00 C22C 38/18; C22C 38/04; F16H 55/06; F16H 55/17; C23C 8/22; C23C 8/80; C21D 9/32; C21D 1/10; C21D 2221/00
USPC .......... 74/437, 438, 434; 148/233, 319, 219, 148/320; 29/893.3
See application file for complete search history.

(56) References Cited

U.S. PATENT DOCUMENTS 4,533,004 A * 8/1985 Ecer ...................... E21B 10/006
                                                    175/379
6,325,867 B1 * 12/2001 Okita ........................ C21D 1/78
                                                    148/226

(Continued)

FOREIGN PATENT DOCUMENTS

JP      2010-131626 A    6/2010
WO      2007/034911 A1   3/2007

*Primary Examiner* — William Kelleher
*Assistant Examiner* — Zakaria Elahmadi
(74) *Attorney, Agent, or Firm* — Sughrue Mion, PLLC

(57) ABSTRACT

A steel gear 1 includes a generally cylindrical outer peripheral ring portion 2, on an outer peripheral surface 20*a* of which a toothed shape 10 is formed, and a flange portion 3 provided to extend radially inward from an inner peripheral surface 20*b* of the outer peripheral ring portion 2. The outer peripheral ring portion 2 includes a first projecting portion 21 that projects toward one side in the axial direction with respect to a coupling position at which the first projecting portion 21 is coupled to the flange portion 3, and a second projecting portion 22 that projects toward the other side in the axial direction with respect to a coupling position at which the second projecting portion 22 is coupled to the flange portion 3. The axial length of the first projecting portion 21 is longer than the axial length of the second projecting portion 22. The outer peripheral ring portion 2 includes a carburized layer 4 formed in a surface layer of the toothed shape 10, and a thermal history layer 5 formed in a region including the carburized layer 4 and at a depth, in the inward direction from the outer peripheral surface 20*a*, larger than the depth of the carburized layer 4, the thermal history layer 5 having a history of being heated through high-frequency induction heating until becoming austenite. The depth T of the thermal history layer 5 in the inward direction from a tooth bottom 104 of the toothed shape 10 is larger at the second projecting portion 22 than at the first projecting portion 21.

4 Claims, 11 Drawing Sheets

(51) Int. Cl.
*C21D 1/10* (2006.01)
*C21D 9/32* (2006.01)
*C23C 8/22* (2006.01)
*C23C 8/80* (2006.01)
*C22C 38/00* (2006.01)
*C22C 38/02* (2006.01)
*C22C 38/04* (2006.01)
*C22C 38/18* (2006.01)
*C22C 1/02* (2006.01)

(52) U.S. Cl.
CPC . *C21D 9/32* (2013.01); *C22C 1/02* (2013.01); *C22C 38/00* (2013.01); *C22C 38/02* (2013.01); *C22C 38/04* (2013.01); *C22C 38/18* (2013.01); *C23C 8/22* (2013.01); *C23C 8/80* (2013.01); *F16H 55/17* (2013.01); *C21D 2221/00* (2013.01); *Y02P 10/253* (2015.11); *Y10T 74/1987* (2015.01)

(56) References Cited

U.S. PATENT DOCUMENTS

| | | | |
|---|---|---|---|
| 7,641,850 B2* | 1/2010 | Sontti | B21H 5/022 148/573 |
| 7,988,796 B2* | 8/2011 | Ohbayashi | B23P 15/00 148/223 |
| 7,998,282 B2 | 8/2011 | Taniguchi et al. | |
| 2002/0179188 A1* | 12/2002 | Yamaguchi | C21D 9/32 148/218 |
| 2005/0133120 A1* | 6/2005 | Walenta | C21D 1/06 148/233 |
| 2006/0105194 A1* | 5/2006 | Kinstler | C22F 1/183 428/660 |
| 2007/0102068 A1* | 5/2007 | Taniguchi | C21D 1/06 148/222 |
| 2008/0095657 A1* | 4/2008 | Burnett | C21D 1/02 420/106 |
| 2009/0301608 A1* | 12/2009 | Taniguchi | C21D 1/00 148/319 |
| 2012/0018050 A1* | 1/2012 | Kubota | C21D 9/32 148/219 |
| 2012/0247249 A1* | 10/2012 | Obayashi | H01L 51/052 74/434 |

* cited by examiner

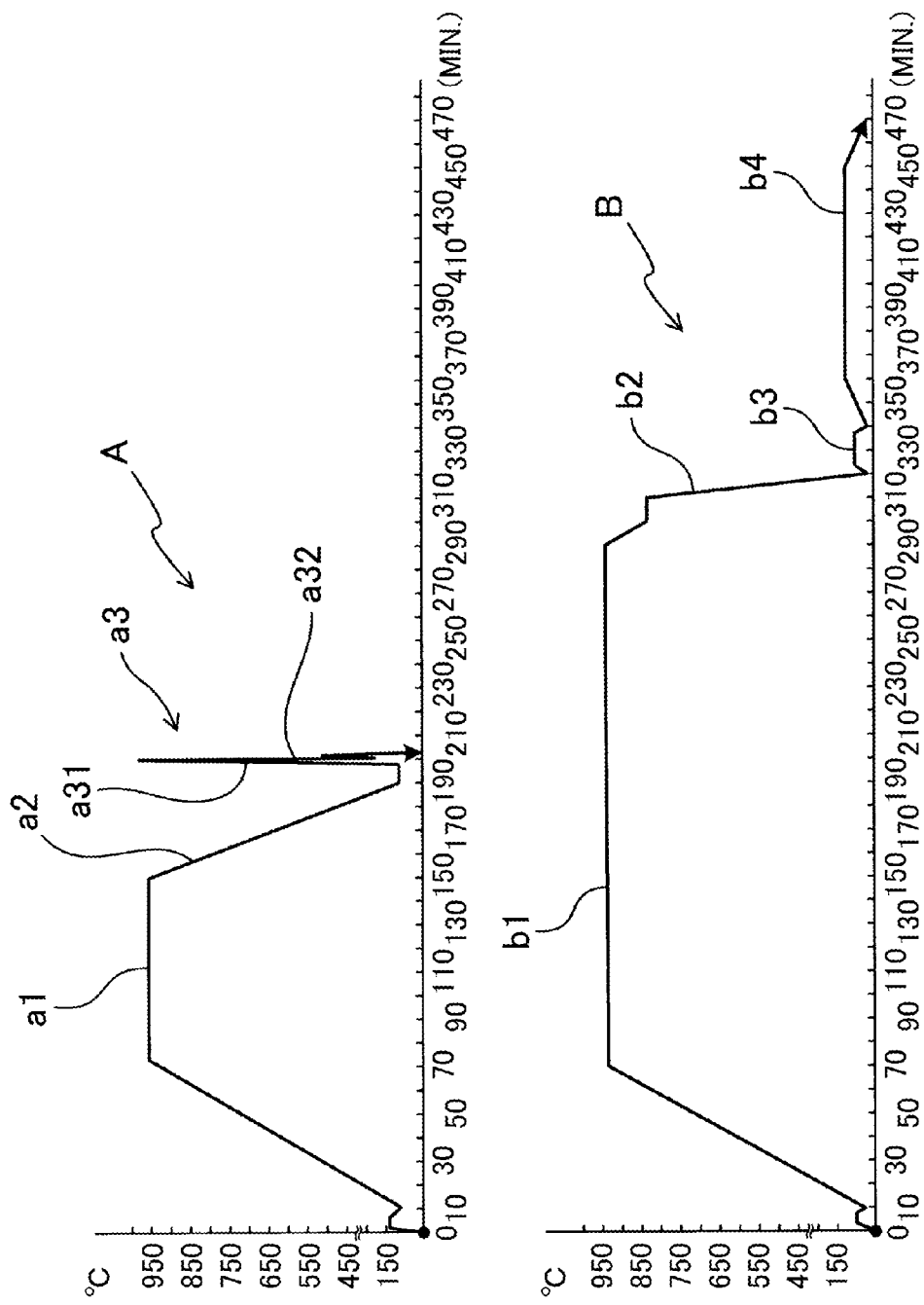

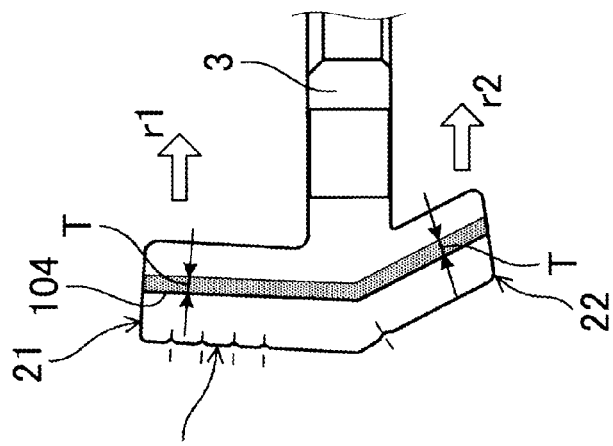
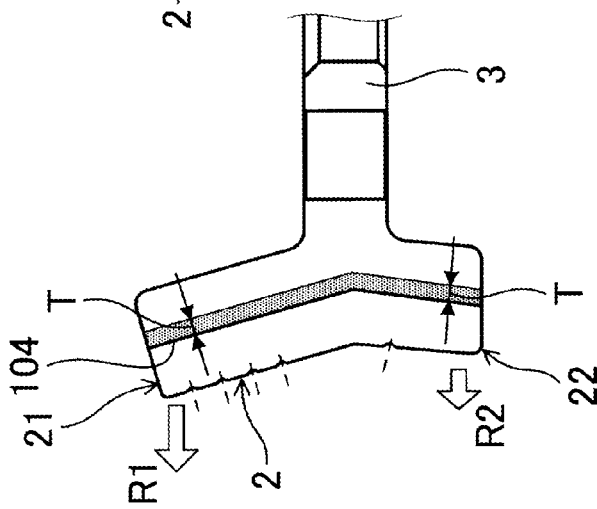
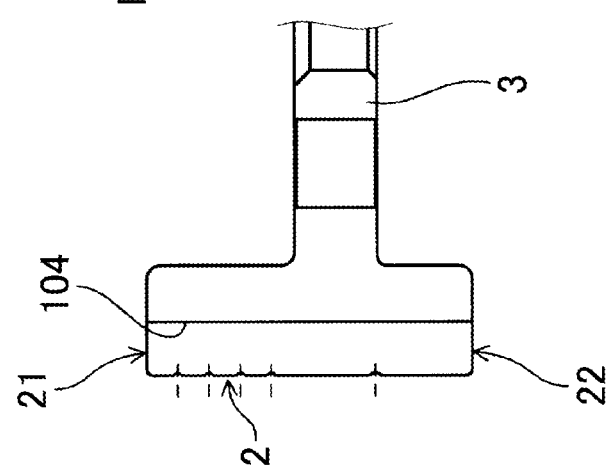

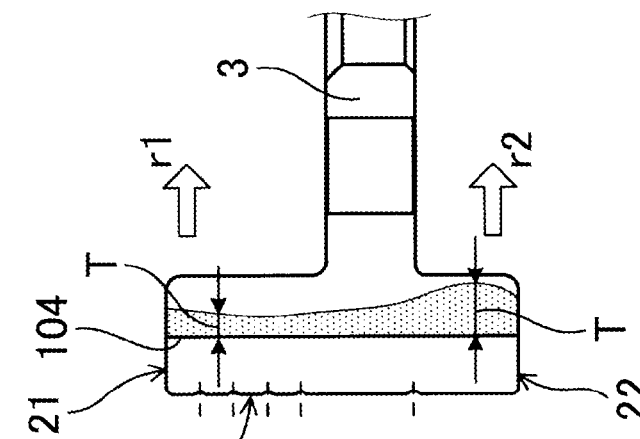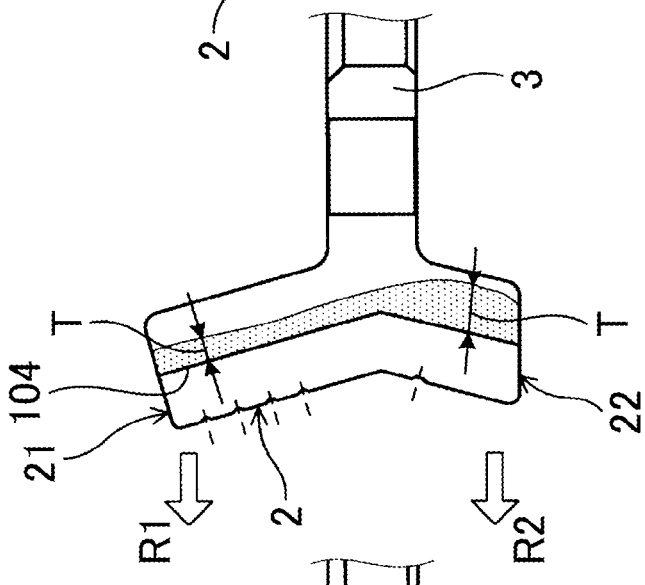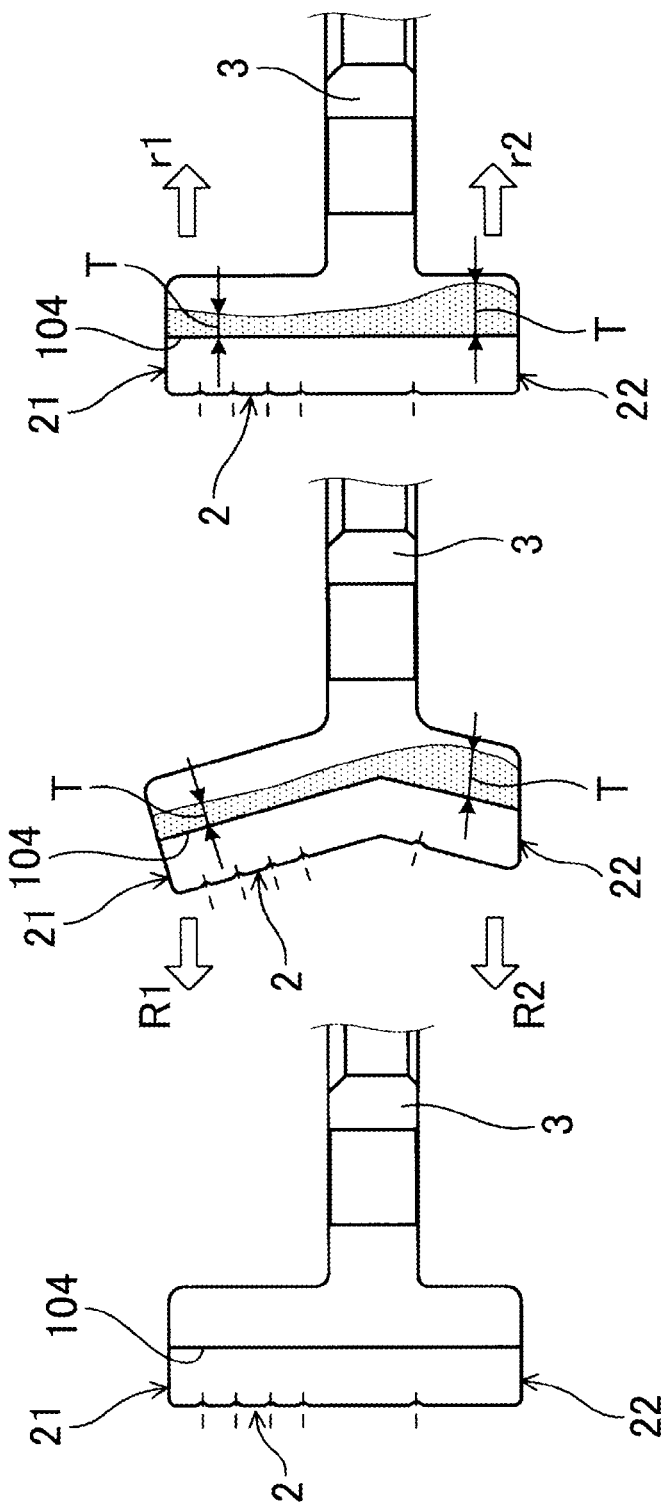

STEEL GEAR AND MANUFACTURING METHOD FOR THE SAME

INCORPORATION BY REFERENCE

The disclosure of Japanese Patent Application No. JP 2011-077747 filed on Mar. 31, 2011 including the specification, drawings and abstract is incorporated herein by reference in its entirety.

BACKGROUND OF THE INVENTION

The present invention relates to a steel gear and a manufacturing method for a steel gear.

DESCRIPTION OF THE RELATED ART

Conventionally, steel gears are used in many industrial fields. For example, differential devices used in the automotive field have a large number of steel gears. There are various shapes of steel gears. Japanese Patent Application Publication No. 2010-131626 (JP 2010-131626 A) discloses a gear including a cylindrical outer peripheral ring portion, on the outer peripheral surface of which a toothed shape is formed, and a flange portion coupled to the inner peripheral surface of the outer peripheral ring portion at a location slightly displaced from the center position of the inner peripheral surface in the axial direction toward one side in the axial direction.

The steel gear is required to provide high strength and wear resistance. Therefore, the steel gear is often subjected to a carburizing process and a quenching process in order that the surface hardness is enhanced while the toughness is maintained. The carburizing process increases the carbon concentration of the surface with steel heated to an austenitizing temperature or more. Normally, the quenching process is performed immediately after the carburizing process. Performing the carburizing process and the quenching process on a tooth-shaped surface of the steel gear enhances the surface hardness of the tooth-shaped surface and secures the internal toughness of the gear.

As the carburizing process and the quenching process described above, there is conventionally known a method in which oil quenching is performed immediately after a gas carburizing process is performed for a long time using a large heat treatment furnace including an oil-quenching bath provided on the exit side. Recently, as disclosed in International Patent Application Publication No. 2007/034911 (WO2007/034911), there has been proposed a method in which a quenching process is performed after a vacuum carburizing process is performed, slow cooling is temporarily performed, and a desired portion of a steel member is heated again through high-frequency induction heating (hereinafter, quenching that utilizes high-frequency induction heating will occasionally be referred to as "high-frequency quenching").

SUMMARY OF THE INVENTION

The "carburizing/slow cooling/high-frequency quenching process" including a carburizing process, temporary slow cooling, and subsequent high-frequency induction heating of a desired portion, which is rapidly cooled and quenched immediately thereafter, can dispense with using fire and oil and reduce the heat treatment time compared to the "carburizing/oil quenching process" according to the related art including a gas carburizing process and subsequent oil quenching. Therefore, the "carburizing/slow cooling/high-frequency quenching process" is a heat treatment technology that reduces the amount of $CO_2$ emissions and that is friendly to the global environment.

In the case where the "carburizing/slow cooling/high-frequency quenching process" according to the related art is simply applied to a steel gear material in which the flange portion is coupled to the inner peripheral surface of the outer peripheral ring portion at a location slightly displaced from the center position of the inner peripheral surface in the axial direction toward one side in the axial direction, however, the outer peripheral ring portion may be distortionally deformed through heat treatment, and a steel gear having sufficient dimensional accuracy may not be obtained. In particular, OBD evaluation in which the outside diameter of the steel gear is evaluated with balls inserted in two tooth grooves located opposite to each other may result in a poor OBD taper, which is the difference between an OBD value at one end portion and an OBD value at the other end portion in the tooth width direction.

The present invention has been made in view of the foregoing issues, and has an object to provide a steel gear having high dimensional accuracy compared to the related art. The present invention also has an object to provide a manufacturing method that provides a steel gear having high dimensional accuracy compared to the related art.

According to a first aspect of the present invention, a steel gear includes:

a generally cylindrical outer peripheral ring portion, on an outer peripheral surface of which a toothed shape is formed; and a flange portion provided to extend radially inward from an inner peripheral surface of the outer peripheral ring portion, in which:

the outer peripheral ring portion includes a first projecting portion that projects toward one side in an axial direction with respect to a coupling position at which the first projecting portion is coupled to the flange portion, and a second projecting portion that projects toward the other side in the axial direction with respect to a coupling position at which the second projecting portion is coupled to the flange portion, an axial length of the first projecting portion being larger than an axial length of the second projecting portion;

the outer peripheral ring portion includes a carburized layer formed in a surface layer of the toothed shape, and a thermal history layer formed in a region including the carburized layer and at a depth, in an inward direction from the outer peripheral surface, larger than a depth of the carburized layer, the thermal history layer having a history of being heated through high-frequency induction heating until becoming austenite; and the depth of the thermal history layer in the inward direction from a tooth bottom of the toothed shape on the outer peripheral surface is larger at the second projecting portion than at the first projecting portion.

According to a second aspect of the present invention, a manufacturing method for a steel gear, includes:

a preparation step in which a steel gear material is prepared, the steel gear material including a generally cylindrical outer peripheral ring portion, on an outer peripheral surface of which a toothed shape is formed, and a flange portion provided to extend radially inward from an inner peripheral surface of the outer peripheral ring portion, the outer peripheral ring portion including a first projecting portion that projects toward one side in an axial direction with respect to a coupling position at which the first projecting portion is coupled to the flange portion, and a second projecting portion that projects toward the other side in the axial direction with respect to a coupling position at which the second projecting portion is coupled to the flange portion, and an axial length of the first projecting portion being larger than an axial length of the second projecting portion;

a carburizing step in which the steel gear material is heated to an austenitizing temperature or more in a decompressed carburizing gas to form a carburized layer in a surface layer of the toothed shape;

a cooling step, subsequent to the carburizing step, in which the steel gear material is cooled at a cooling rate less than a cooling rate at which martensitic transformation is caused and in which the steel gear material is cooled to a temperature equal to or less than a temperature at which structure transformation due to the cooling is completed; and a quenching step in which a region of the steel gear material including the carburized layer and at a depth, in an inward direction from the outer peripheral surface, larger than a depth of the carburized layer is heated through high-frequency induction heating until becoming austenite, and in which the steel gear material is thereafter cooled at a cooling rate equal to or more than the cooling rate at which martensitic transformation is caused, in which the quenching step includes adjusting a heating depth through the high-frequency induction heating in the inward direction from a tooth bottom of the toothed shape on the outer peripheral surface so as to be larger at the second projecting portion than at the first projecting portion.

The steel gear includes the thermal history layer formed in the outer peripheral ring portion, and the depth of the thermal history layer in the inward direction from the tooth bottom of the toothed shape on the outer peripheral surface is larger at the second projecting portion than at the first projecting portion. By adopting the thus configured thermal history layer, the steel gear provides high dimensional accuracy as long as the thermal history layer is configured as described above even in the case where the steel gear is manufactured by a method including the "carburizing/slow cooling/high-frequency quenching process" described above.

The manufacturing method allows suitable manufacture of the steel gear. The manufacturing method includes the preparation step in which a steel gear material is prepared, the steel gear material including a generally cylindrical outer peripheral ring portion, on an outer peripheral surface of which a toothed shape is formed, and a flange portion provided to extend radially inward from an inner peripheral surface of the outer peripheral ring portion. Here, the outer peripheral ring portion of the steel gear material includes a first projecting portion that projects toward one side in an axial direction with respect to a coupling position at which the first projecting portion is coupled to the flange portion, and a second projecting portion that projects toward the other side in the axial direction with respect to a coupling position at which the second projecting portion is coupled to the flange portion, and an axial length of the first projecting portion is larger than an axial length of the second projecting portion. That is, in the steel gear material, the flange portion is coupled to the inner peripheral surface of the outer peripheral ring portion at a location slightly displaced from the center position of the inner peripheral surface in the axial direction toward one side in the axial direction. In the manufacturing method, the steel gear material shaped as described above is subjected to the "carburizing/slow cooling/high-frequency quenching process".

That is, in the carburizing step, the steel gear material is heated to an austenitizing temperature or more in a decompressed carburizing gas to form a carburized layer in a surface layer of the toothed shape. Consequently, a carburized layer having a carbon concentration higher than that of the base material is introduced along the outline of the toothed shape. In the cooling step, subsequent to the carburizing step, the steel gear material is cooled at a cooling rate less than a cooling rate at which martensitic transformation is caused, and the steel gear material is cooled to a temperature equal to or less than a temperature at which structure transformation due to the cooling is completed. Consequently, a steel gear material in which the outer peripheral ring portion includes substantially no martensite structure is obtained.

After that, in the quenching step, a region of the steel gear material including the carburized layer and at a depth, in an inward direction from the outer peripheral surface, larger than a depth of the carburized layer is heated through high-frequency induction heating until becoming austenite, and the steel gear material is thereafter cooled at a cooling rate equal to or more than the cooling rate at which martensitic transformation is caused. Consequently, the carburized layer is transformed into a martensite structure, and the surface layer of the toothed shape is hardened. In addition, a thermal history layer having a history of being heated through high-frequency induction heating until becoming austenite is formed in the region including the carburized layer and at a depth, in the inward direction from the outer peripheral surface, larger than the depth of the carburized layer.

Notably, the quenching step includes adjusting the heating depth through the high-frequency induction heating in the inward direction from the tooth bottom of the toothed shape on the outer peripheral surface so as to be larger at the second projecting portion than at the first projecting portion.

Conventionally, in the case where the steel gear material shaped as described above is subjected to high-frequency quenching, the heating depth through the high-frequency induction heating in the inward direction from the tooth bottom of the toothed shape on the outer peripheral surface is normally adjusted so as to be uniform over the entire outer peripheral ring portion in the axial direction. If such an adjustment is performed, however, the outer peripheral ring portion may be distortionally deformed through heat treatment, and a steel gear having sufficient dimensional accuracy may not be obtained. In particular, the outer peripheral ring portion may often have a poor OBD taper.

In the case where the heating depth through the high-frequency induction heating in the inward direction from the tooth bottom of the toothed shape on the outer peripheral surface is adjusted so as to be larger at the second projecting portion than at the first projecting portion as discussed above, however, the dimensional accuracy of the steel gear after being subjected to the quenching step can be improved. In particular, the outer peripheral ring portion can have a small OBD taper. Such findings are made for the first time by the present invention. This is estimated to be because of the following reasons.

In the case where the heating depth through high-frequency induction heating in the inward direction from the tooth bottom of the toothed shape on the outer peripheral surface of the outer peripheral ring portion is adjusted so as to be uniform over the entire outer peripheral ring portion in the axial direction as in the related art, the following mechanism is conceivable. That is, the first projecting portion is farther from the coupling position with the flange portion, and therefore bound by the flange portion with a small force compared to the second projecting portion. On the other hand, the second projecting portion is closer to the coupling position with the flange portion, and therefore bound by the flange portion with a large force compared to the first projecting portion. Therefore, it is considered that the end portion side of the first projecting portion is significantly deformed radially outward through thermal expansion, and that the end portion side of the second projecting portion is less deformed radially outward through thermal expansion than the end portion side of the first projecting portion. In addition, it is also considered that the flange portion is slightly plastically deformed by deformation of the first projecting portion and the second projecting portion through thermal expansion. Then, when cooling is performed through quenching in this state, the first projecting portion and the second projecting portion are deformed radially inward. In this event, it is considered that the manufacturing method according to the related art results in a steel gear distorted into a shape with a large OBD taper because of the difference in magnitude of the amount of deformation during high-frequency induction heating.

In the case where the heating depth through high-frequency induction heating in the inward direction from the tooth bottom of the toothed shape on the outer peripheral surface of the outer peripheral ring portion is adjusted so as to be larger at the second projecting portion than at the first projecting portion, in contrast, the following mechanism is conceivable. That is, it is considered that the end portion side of the second projecting portion, which is less easily deformed during high-frequency induction heating than the end portion side of the first projecting portion when the heating depth is uniform, is deformed to approximately the same degree as the end portion side of the first projecting portion because of the adjustment of the heating depth described above. In addition, it is also considered that the flange portion is slightly plastically deformed by deformation of the first projecting portion and the second projecting portion through thermal expansion. Then, when cooling is performed through quenching in this state, the first projecting portion and the second projecting portion are deformed radially inward. In this event, it is considered that a steel gear in a shape with a small OBD taper is finally obtained because of the fact that the first projecting portion and the second projecting portion are deformed in approximately the same amount as each other during high-frequency induction heating.

According to the manufacturing method described above, in addition, the region including the carburized layer and at a depth, in the inward direction from the tooth bottom of the toothed shape on the outer peripheral surface, larger than the depth of the carburized layer is also partially subjected to high-frequency quenching, which increases the internal hardness. Therefore, it is possible to obtain a steel gear having high dimensional accuracy and high strength that is suitable for a high torque transfer gear, such as a differential gear, that is required to provide high dimensional accuracy and that is subjected to a stress applied not only to the surface layer of the toothed shape thereof but also to the inside thereof. In addition, the steel gear, although not subjected to a shot-peening process, can provide strength that is approximately as high as that of a steel gear of the same shape obtained through a "carburizing/oil quenching process" according to the related art in which oil quenching is performed after a gas carburizing process.

The manufacturing method described above can dispense with using fire and oil and reduce the heat treatment time compared to the "carburizing/oil quenching process" according to the related art. Therefore, the manufacturing method reduces the amount of $CO_2$ emissions, and is friendly to the global environment. In addition, the heat treatment line can be shortened. Therefore, a compact manufacturing line for a steel gear can be constructed.

Thus, a steel gear having high dimensional accuracy compared to the related art can be provided. In addition, a manufacturing method that provides a steel gear having high dimensional accuracy compared to the related art can be provided.

BRIEF DESCRIPTION OF THE DRAWINGS

FIG. 1 illustrates a steel gear (differential gear) according to a first embodiment, in which

FIG. 2 illustrates an outer peripheral ring portion of the steel gear according to the first embodiment, in which

FIG. 3A illustrates an example of a heat pattern according to a manufacturing method for a steel gear according to the first embodiment, and FIG. 3B illustrates an example of a heat pattern according to a manufacturing method for a steel gear that uses carburizing/oil quenching according to the related art;

FIG. 8 illustrates an estimated mechanism to provide a steel gear in a shape with a large OBD taper in the manufacturing method for a steel gear according to the comparative example 1, in which FIG. 8A shows a state before a carburizing step, FIG. 8B shows a state during high-frequency induction heating in a quenching step, and FIG. 8C shows a state after cooling in the quenching step;

FIG. 9 illustrates an estimated mechanism to provide a steel gear in a shape with a small OBD taper in the manufacturing method for a steel gear according to the first embodiment, in which FIG. 9A shows a state before a carburizing step, FIG. 9B shows a state during high-frequency induction heating in a quenching step, and FIG. 9C shows a state after cooling in the quenching step;

FIGS. 10A to 10D show a photograph of a cut surface of the steel gear according to the first embodiment and photographs of metal structures, in which FIG. 10A is a photograph of a carburized layer, FIG. 10B is a photograph of a thermal history layer, and FIG. 10C is a photograph of a metal structure located internally of the thermal history layer; and FIG. 10D shows the cut surfaces of the steel gear.

DETAILED DESCRIPTION OF THE EMBODIMENTS

Figure 1B:
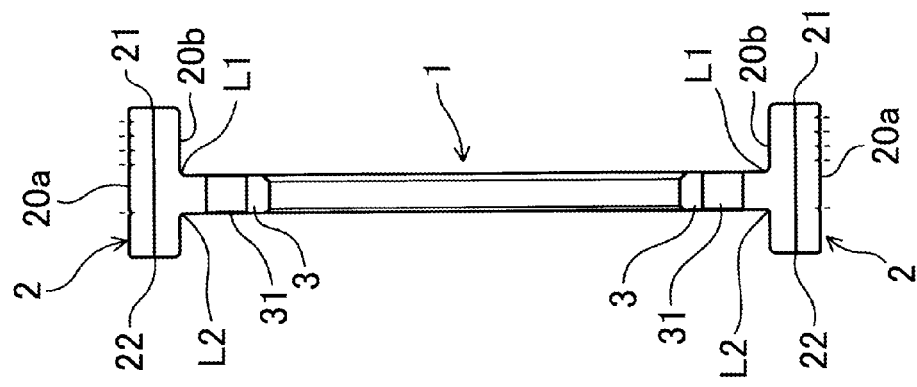
FIG. 1A is a plan view and FIG. 1B is an A-A sectional view.

The steel gear described above is formed such that the axial length of the first projecting portion of the outer peripheral ring portion is longer than the axial length of the second projecting portion. Here, the phrase "axial length of the first projecting portion" refers to the distance from the coupling position of the flange portion, which is coupled to the inner peripheral surface of the outer peripheral ring portion, on the first projecting portion side to the distal-end portion of the first projecting portion. Meanwhile, the phrase "axial length of the second projecting portion" refers to the distance from the coupling position of the flange portion, which is coupled to the inner peripheral surface of the outer peripheral ring portion, on the second projecting portion side to the distal-end portion of the second projecting portion. Thus, in the steel gear, the flange portion is coupled to the inner peripheral surface of the outer peripheral ring portion at a position displaced to one side in the axial direction from the center position of the inner peripheral surface in the axial direction. It should be noted, however, that the steel gear includes the first projecting portion and the second projecting portion as described above. Therefore, the steel gear is not shaped such that the flange portion is coupled to one end portion of the inner peripheral surface of the outer peripheral ring portion in the axial direction.

The basic chemical component of the steel material forming the steel gear preferably has a C content in the range of 0.1 to 0.4% by mass, more preferably in the range of 0.15 to 0.25% by mass. The term "basic chemical component" means the basic chemical component of the base material before the carbon concentration of the surface layer is increased by a carburizing process, that is, of steel itself. If the lower limit of the C content is equal to or more than 0.15% by mass, the internal strength of the gear is easily secured. If the upper limit of the C content is equal to or less than 0.25% by mass, on the other hand, the toughness and the cuttability of the steel gear are easily brought into a suitable range. For other chemical components, components optimum for carburization may be selected.

Specific examples of a steel material serving as the base material forming the steel gear include SCM 420 (JIS) and various types of steel for carburization known in the art with a C content in the range described above.

The carburized layer of the outer peripheral ring portion may be provided along the outline of the toothed shape formed on the outer peripheral surface, for example. The carburized layer is quenched after high-frequency induction heating to be discussed later, and has a hardness higher than that of the base material. The carbon concentration of the carburized layer is higher than the carbon concentration of the base material of the steel material forming the steel gear. The carbon concentration of the carburized layer is preferably 0.50 to 0.90%, more preferably 0.50 to 0.70%, from the viewpoint of wear resistance, pitting strength, etc. for obtaining a surface hardness desirable for automotive parts such as a differential gear.

The thermal history layer of the outer peripheral ring portion is provided in a region including the carburized layer and at a depth, in the inward direction from the outer peripheral surface, larger than the depth of the carburized layer. For portions corresponding to the teeth of the toothed shape formed on the outer peripheral surface, the thermal history layer may be provided in a region including the carburized layer formed on the surface of the teeth and between the tooth tip and the root circle, and may further be provided in a region located radially inwardly of the root circle. For portions corresponding to the tooth grooves between the teeth of the toothed shape formed on the outer peripheral surface, meanwhile, the thermal history layer may be provided in a region including the carburized layer formed on the surface of the tooth bottom and at a depth, in the inward direction from the tooth bottom, larger than the depth of the carburized layer.

The thermal history layer has a history of being heated through high-frequency induction heating until becoming austenite. Thus, the thermal history layer is different in metal structure from a region that is located internally of the thermal history layer and that has not been heated through high-frequency induction heating until becoming austenite. Therefore, in the case where the teeth are cut along the tooth bottom, it is possible to distinguish the thermal history layer provided inwardly of the tooth bottom and a region located internally of the thermal history layer from each other conveniently on the basis of the difference in coloring due to the difference in metal structure in the cut surface, and more particularly on the basis of the metal structures observed in the cut surface. Similarly, if the teeth are cut in a direction perpendicular to the axial direction, it is possible to find the thermal history layer provided between the tooth tip and the tooth bottom, and further the thermal history layer which may be provided internally of the tooth bottom.

Here, the steel gear is configured such that the depth of the thermal history layer in the inward direction from the tooth bottom of the toothed shape on the outer peripheral surface is larger at the second projecting portion than at the first projecting portion. That is, in the case where the steel gear is cut along the tooth bottom to examine the cut surface, the steel gear has such depth distribution that the depth of the thermal history layer over the entire second projecting portion in the axial direction is larger than the depth of the thermal history layer over the entire first projecting portion in the axial direction. Thus, the depth distribution indicates that the deepest portion of the thermal history layer, at which the depth of the thermal history layer reaches its peak, is provided in the second projecting portion. For a portion between the first projecting portion and the second projecting portion, the thermal history layer has a depth that is approximately in the middle between the depth of the thermal history layer at the first projecting portion and the depth of the thermal history layer at the second projecting portion.

Here, defining the depth of the thermal history layer in the inward direction from the tooth bottom of the toothed shape on the outer peripheral surface as T, and defining the distance from the tooth bottom of the toothed shape on the outer peripheral surface to the inner peripheral surface as W, the steel gear is preferably configured such that T/W at the second projecting portion is larger than T/W at the first projecting portion.

In this case, the respective depths of the thermal history layers in the first projecting portion and the second projecting portion are adjusted in consideration of the distance from the tooth bottom of the toothed shape on the outer peripheral surface to the inner peripheral surface. Therefore, the steel gear has high dimensional accuracy with a small OBD taper at the outer peripheral ring portion. Further, the steel gear has high strength because not only the carburized layer but also a portion located internally of the carburized layer is hardened.

Also in this case, in the same manner as described above, the steel gear may have such depth distribution that T/W over the entire second projecting portion in the axial direction is larger than T/W over the entire first projecting portion in the axial direction. That is, the depth distribution may indicate that the deepest portion of the thermal history layer, at which T/W reaches its peak, is provided in the second projecting portion.

From the viewpoint of the balance between the effect of improving the dimensional accuracy and the enhancement of the strength due to a rise in internal hardness, T/W at the first projecting portion is preferably in the range of 30 to 60%, more preferably 35 to 55%, further preferably 40 to 50%. Meanwhile, T/W at the second projecting portion is preferably in the range of 75 to 95%, more preferably 80 to 90%.

In the steel gear, in addition, the outer peripheral ring portion is preferably configured such that the carburized layer has a martensite structure, a portion of the thermal history layer excluding the carburized layer has a ferrite-martensite structure, and a portion located internally of the thermal history layer has a ferrite-pearlite structure.

In this case, the balance between the dimensional accuracy and the strength is excellent. Therefore, the steel gear may be suitably used as a high torque transfer gear, such as a differential gear, that is required to provide high dimensional accuracy and that is subjected to a stress applied not only to the surface layer of the toothed shape thereof but also to the inside thereof.

Next, each step in the manufacturing method for a steel gear is preferably configured as follows.

That is, specifically, the carburizing step is effectively performed in a decompressed carburizing gas, the pressure of which has been reduced to be lower than the atmospheric pressure. In this case, the carburizing process can be performed using a relatively small amount of the carburizing gas while the inside of a carburizing furnace is maintained at a high temperature in a decompressed state. Thus, the carburizing process can be performed more efficiently than in the related art. In addition, a heating process performed in the related art over a long time using a large heat treatment furnace is no longer necessary. Thus, it is possible to reduce processing time, energy consumption, and further the size of the carburizing/quenching apparatus itself.

The carburizing step is preferably performed under a decompression condition at 1 to 100 hPa. In the case where the pressure during the carburization is reduced to 1 hPa or more, an expensive apparatus is advantageously not required to maintain the degree of vacuum. In the case where the pressure is reduced to 100 hPa or less, on the other hand, soot is not easily generated during the carburization, and unevenness in carburization concentration is advantageously not easily caused. As the carburizing gas, hydrocarbon gases such as acetylene, propane, butane, methane, ethylene, and ethane, for example, may be used.

The carburizing step is preferably performed such that the surface carbon concentration of the tooth-shaped surface of the steel gear material after the carburizing process is in the range of 0.50% to 0.70%. In this case, the carburized layer has a carbon amount equal to or less than that of eutectoid steel, and is transformed into austenite by being heated during quenching, and easily transformed into a martensite structure without cementite precipitation during subsequent rapid cooling.

The cooling step is performed under a slow-cooling condition corresponding to a cooling rate at least less than the cooling rate at which the steel gear material is subjected to martensitic transformation during the cooling. Consequently, occurrence of distortion due to martensitic transformation can be suppressed, and the carburizing process can be finished with the steel gear material having excellent shape accuracy.

More specifically, the cooling step is preferably performed under a slow-cooling condition corresponding to a cooling rate of 0.1° C./second to 3.0° C./second while the temperature of the steel gear material is at least equal to or more than the A1 transformation temperature. In the case where the cooling rate is equal to or less than 3.0° C./second, a sufficient effect of suppressing occurrence of distortion during the cooling is easily obtained. In the case where the cooling rate in the cooling step is equal to or more than 0.1° C./second, on the other hand, it is unlikely to take a long time before the A1 transformation temperature is reached. Therefore, the speed of diffusion of carbon for carburization in the steel is unlikely to fluctuate. As a result, fluctuations in carbon concentration are suppressed easily.

The cooling step is preferably performed in a cooling gas, the pressure of which has been reduced to be lower than the atmospheric pressure. Consequently, occurrence of distortion during the cooling can be further suppressed.

In the case where a cooling step that utilizes the effect of decompression of a cooling gas is adopted, the next quenching step can be started with occurrence of distortion of the steel gear material suppressed. The effect is highest in the case where decompressed slow cooling is performed by adopting slow cooling performed at a low cooling rate. By making additional use of the advantage of the quenching step which utilizes the high-frequency induction heating discussed above, a steel gear having high dimensional accuracy with little distortion after the quenching is easily obtained.

In the case where decompressed carburization is adopted in the carburizing step, decompressed cooling is adopted in the cooling step, and the decompressed carburization and the decompressed cooling are performed continuously, a decompressed carburizing chamber and a decompressed cooling chamber can be directly connected to each other in the actual apparatus. Therefore, there is no need to provide a preparation chamber etc. provided between the two chambers to adjust the degree of decompression. That is, in this case, both the carburizing step and the cooling step are performed in a decompressed state, and thus the difference in pressure between the two processed can be reduced. Therefore, the steel gear material after the decompressed carburizing process can be subjected to the decompressed cooling process without being exposed to normal pressure, and thus can be processed efficiently with occurrence of distortion suppressed.

More specifically, the cooling gas in the cooling step is preferably decompressed to 100 hPa to 650 hPa. In the case where the pressure is higher than the range of 100 to 650 hPa, a sufficient effect of the decompression may not be obtained in the decompressed cooling process. Pressures lower than the range may be difficult because of the apparatus configuration. Therefore, the cooling gas is more preferably decompressed to the range of 100 hPa to 300 hPa.

In the quenching step, preferably, a temperature in a relatively low range (for example, 750° C. to 950° C.) is selected as an austenitizing temperature for steel, and a relatively small amount of energy is input during high-frequency induction heating, so that heating is performed for a relatively long time (for example, more than 10 seconds). In this case, a deeper portion at a depth of 1 mm or more from the surface is easily heated through heat transfer. That is, in the case where the conditions for the high-frequency induction heating are determined so as to allow such low-temperature long-time heating, the quenching effect can be obtained not only in a region of the carburized layer but also in a portion deeper inside, and the effect of suppressing distortion due to the quenching step can be enhanced as the austenitizing temperature is lower.

In the quenching step, defining the heating depth through high-frequency induction heating in the inward direction from the tooth bottom of the toothed shape on the outer peripheral surface as T, and defining the distance from the tooth bottom of the toothed shape on the outer peripheral surface to the inner peripheral surface as W, the heating depth through high-frequency induction heating is preferably adjusted such that T/W at the second projecting portion is larger than T/W at the first projecting portion.

In this case, the respective heating depths through high-frequency induction heating at the first projecting portion and the second projecting portion can be adjusted in consideration of the distance from the tooth bottom of the toothed shape on the outer peripheral surface to the inner peripheral surface. Therefore, it is possible to obtain a steel gear having high dimensional accuracy with a small OBD taper at the outer peripheral ring portion. Further, it is possible to obtain a steel gear having high strength because not only the carburized layer but also a portion located internally of the carburized layer is hardened. A high-frequency induction heating unit known in the art may be used.

The method of adjusting the heating depth through high-frequency induction heating at the first projecting portion and the second projecting portion is not specifically limited. Specific examples of the adjustment method include varying the clearance between the inside diameter of a coil of the high-frequency induction heating unit and the major diameter at the tooth tip of the gear, disposing the coil of the high-frequency induction heating unit at a position shifted toward the second projecting portion in the axial direction compared to the related art, adjusting the number of turns of the coil such that more heat is applied to the second projecting portion than to the first projecting portion, and locally cooling only the first projecting portion of the outer peripheral ring portion.

Adjusting the heating depth through the high-frequency induction heating preferably includes a step of cooling the inner peripheral surface side of the first projecting portion during the high-frequency induction heating.

In this case, the respective heating depths through high-frequency induction heating at the first projecting portion and the second projecting portion are easily adjusted to the relationship described above. Therefore, it is possible to easily obtain a steel gear having high dimensional accuracy. Examples of the method of cooling the inner peripheral surface side of the first projecting portion include water cooling.

Further, the distal-end portion of the first projecting portion and the distal-end portion of the second projecting portion are preferably held by jigs during high-frequency induction heating. The respective distal-end portions tend to be excessively heated during high-frequency induction heating. Therefore, if the distal-end portions are held using jigs, heat is released from the distal-end portions through the jigs, thereby fusion of the distal-end portions is easily avoided.

The cooling of the steel gear material after high-frequency induction heating is preferably performed by water cooling. If high-frequency induction heating is utilized, the tooth-shaped surface side, rather than the entirety, of the steel gear material can be heated accurately. Therefore, even if water quenching is performed thereafter using water that provides a very high cooling effect, occurrence of distortion due to the quenching is easily suppressed compared to a case where the "carburizing/oil quenching process" according to the related art is performed. The excellent rapid cooling effect of the water cooling improves the quenching properties, thereby further enhancing the strength of the quenched portion. In some cases, by virtue of the enhanced strength, the required strength can be provided even if the carburizing process is simplified (the processing time is reduced), or the carburized layer is made thinner. In such cases, the time of the overall heat treatment step can be further shortened.

Preferably, the steel gear material is heated one by one through high-frequency induction heating, and when the steel gear material after being heated is to be cooled, cooling water is injected toward the steel gear material from around it to cool the steel gear material while the steel gear material is rotated. In this case, the steel gear material can be cooled uniformly, thereby further occurrence of distortion can be suppressed.

Embodiment

A steel gear and a manufacturing method for a steel gear according to an embodiment will be specifically described below with reference to the drawings. The steel gear according to the embodiment is obtained by applying the present invention to a differential gear. Reference symbols are used as appropriate.

Figure 1A:
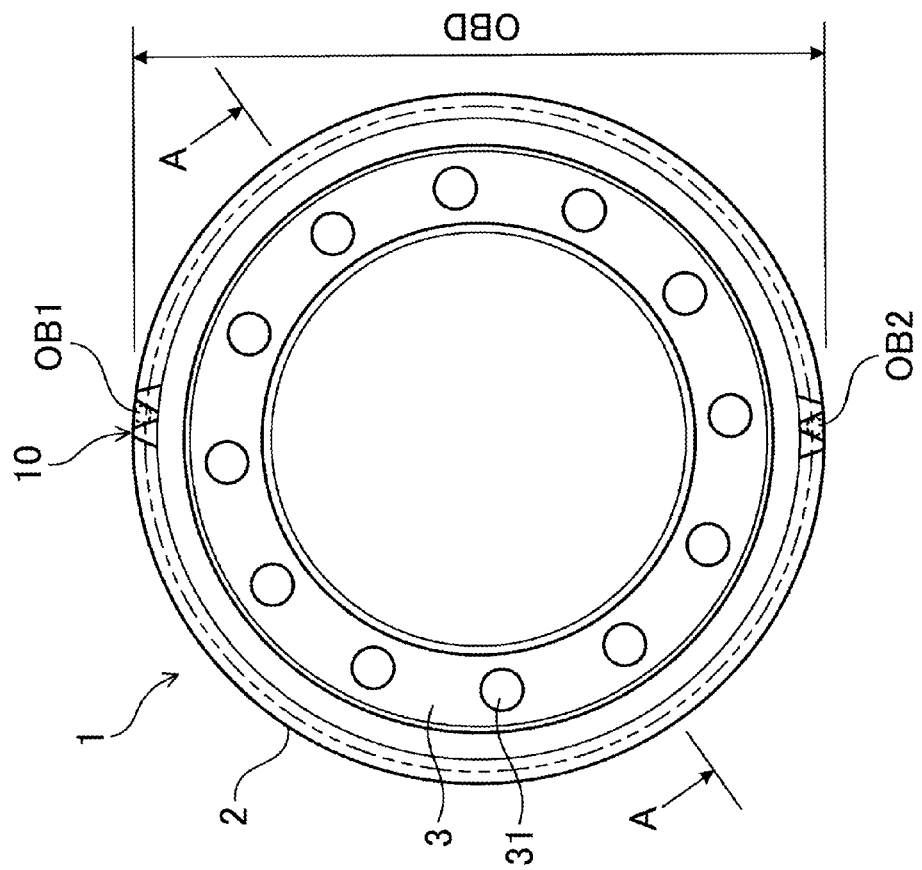

First, a schematic configuration of a steel gear according to a first embodiment will be described. As shown in FIG. 1, a steel gear 1 includes a generally cylindrical outer peripheral ring portion 2, on an outer peripheral surface 20*a* of which a toothed shape 10 is formed, and a flange portion 3 provided to extend radially inward from an inner peripheral surface 20*b* of the outer peripheral ring portion 2. The outer peripheral ring portion 2 includes a first projecting portion 21 that projects toward one side in the axial direction with respect to a coupling position L1 with the flange portion 3, and a second projecting portion 22 that projects toward the other side in the axial direction with respect to a coupling position L2 with the flange portion 3. The axial length of the first projecting portion 21 is longer than the axial length of the second projecting portion 22. In the example, the toothed shape 10 on the outer peripheral surface 20*a* of the outer peripheral ring portion 2 is a helical shape. As shown in FIG. 2B, the toothed shape 10 is formed from a plurality of teeth 101. A tooth tip 102 is provided at the distal end of each of the teeth 101. A tooth groove 103 is provided between the teeth 101. A tooth bottom 104 is provided at the bottom portion of the tooth groove 103. A root circle is obtained by connecting the tooth bottoms 104 to each other.

Figure 2A:
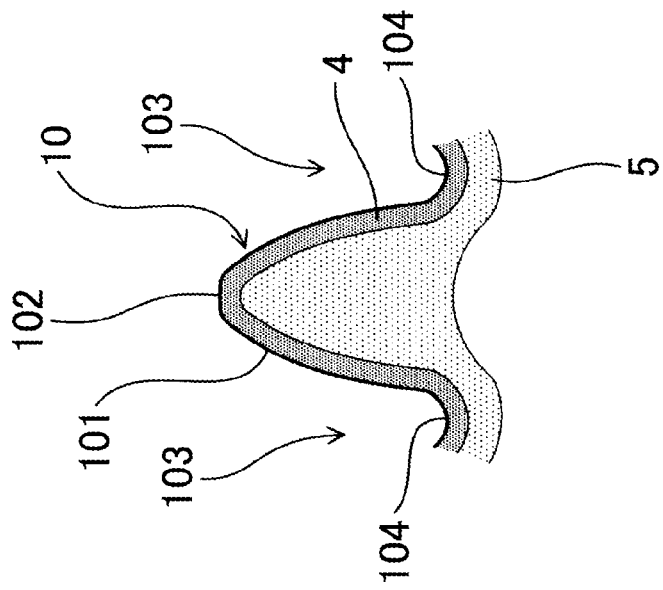
FIG. 2A is a sectional view schematically showing a cut surface taken along a tooth bottom.
Figure 2B:
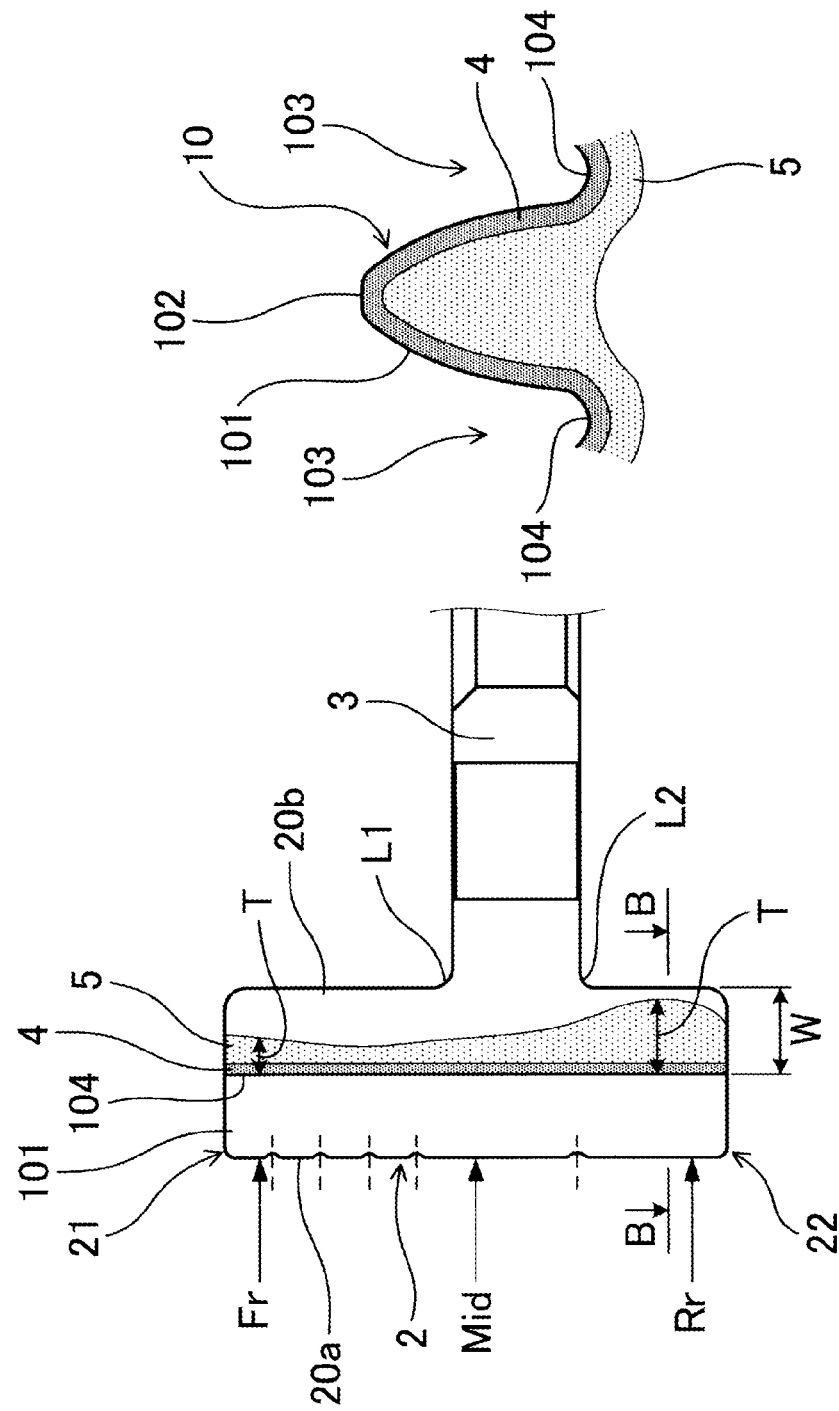
FIG. 2B is a cross-sectional view schematically showing a part of the B-B cross section.

As shown in FIGS. 2A and 2B as enlarged, a carburized layer 4 and a thermal history layer 5 are formed in the outer peripheral ring portion 2. The carburized layer 4 is formed in the surface layer of the toothed shape 10 along the outline of the toothed shape 10. Meanwhile, the thermal history layer 5 is provided in a region including the carburized layer 4 and at a depth T, in the inward direction from the outer peripheral surface 20*a*, larger than the depth of the carburized layer 4. In addition, the thermal history layer 5 has a history of being heated through high-frequency induction heating until becoming austenite.

In a portion of the steel gear 1 according to the example located radially inwardly of the tooth bottom 104, as shown in FIG. 2A, the thermal history layer 5 is provided in a region including the carburized layer 4 formed in the surface layer of the tooth bottom 104 and at a depth T, in the inward direction from the tooth bottom 104, larger than the depth of the carburized layer 4. Meanwhile, in a portion of the steel gear 1 corresponding to the teeth 101 of the toothed shape 10, as shown in FIG. 2B, the thermal history layer 5 is provided in a region including the carburized layer 4 formed in the surface layer of the teeth 101 and ranging from the tooth tip 102 to the vicinity of the root circle.

In the steel gear 1 according to the example, as shown in FIG. 2A, the depth T of the thermal history layer 5 in the inward direction from the tooth bottom 104 of the toothed shape 10 is larger at the second projecting portion 22 than at the first projecting portion 21. More specifically, defining the depth of the thermal history layer 5 in the inward direction from the tooth bottom 104 of the toothed shape 10 on the outer peripheral surface 20a as T, and defining the distance from the tooth bottom 104 of the toothed shape 10 on the outer peripheral surface 20a to the inner peripheral surface 20b as W, T/W at the second projecting portion 22 is larger than T/W at the first projecting portion 21. That is, the steel gear 1 has such depth distribution of the thermal history layer 5, which extends inward from the tooth bottom 104 of the toothed shape 10 of the outer peripheral ring portion 2, that T/W for the thermal history layer 5 over the entire second projecting portion 22 in the axial direction is larger than T/W for the thermal history layer 5 over the entire first projecting portion 21 in the axial direction.

Next, a manufacturing method for a steel gear according to the first embodiment and the evaluation results for the steel gear according to the first embodiment obtained by the manufacturing method will be described.

First, a steel gear material having a shape shown in FIG. 1 was prepared by hot forging using as a raw material SCM 420 (JIS) suitable for carburization. The axial length of the first projecting portion 21 of the steel gear material (the distance from the coupling position L1 on the first projecting portion 21 side of the flange portion 3 to the distal-end portion of the first projecting portion 21) was set to 19.1 mm. The axial length of the second projecting portion 22 (the distance from the coupling position L2 on the second projecting portion 22 side of the flange portion 3 to the distal-end portion of the second projecting portion 22) was set to 12.4 mm. The thickness of the flange portion 3 was set to 10.5 mm. The flange portion 3 had a plurality of insertion holes 31 arranged in the circumferential direction for insertion of fastening members such as bolts. In the example, in addition, the value of W in the outer peripheral ring portion 2 of the steel gear material was set to be constant at 7.75 mm over the entire length in the axial direction.

Next, the steel gear material prepared as described above was subjected to a "carburizing/slow cooling/high-frequency quenching process". The process will be specifically described below.

FIG. 3 shows the temperature of the steel gear material during heat treatment as a heat pattern, with the horizontal axis representing the time and the vertical axis representing the temperature. In the manufacturing method for a steel gear according to the first embodiment, as indicated by a heat pattern A of FIG. 3A, the temperature is raised to a carburizing temperature of 950° C. over 70 minutes, and kept at 950° C. for 80 minutes to perform a carburizing step a1. Subsequent to the carburizing step a1, a cooling step a2 is performed in which the temperature is slowly lowered to a temperature of 150° C. or less over 40 minutes. After that, a quenching step a3 in which the temperature is rapidly raised again to a quenching temperature of 950° C. through high-frequency induction heating, followed by water quenching.

The manufacturing method for a steel gear according to the first embodiment was performed using a heat treatment apparatus including a pre-wash bath for washing the steel gear material before the carburizing step a1, a decompressed carburizing/slow cooling device including a heating chamber, a decompressed carburizing chamber, and a decompressed cooling chamber, a high-frequency quenching device, and a magnetic flaw detection device for inspection for a defect.

In a manufacturing method for a steel gear widely known in the related art, for example, as indicated by a heat pattern B of FIG. 3B, the temperature is raised to a carburizing temperature of 950° C. over 70 minutes, and kept at 950° C. for 220 minutes to perform a carburizing step b1. After that, the temperature is kept at a quenching temperature of 850° C., and thereafter an oil quenching step b2 is performed. Further, a post-wash step b3, in which cooling oil having adhered during the oil quenching is washed off, and a tempering step b4 are performed.

The manufacturing method for a steel gear according to the related art which uses the heat pattern B of FIG. 3B is performed using a heat treatment apparatus including a pre-wash bath for washing the steel gear material before the carburizing step b1, a long and large carburizing furnace including a carburizing furnace for heating and carburization and a quenching oil bath, a post-wash bath for washing the steel gear material after carburization and oil quenching, and a tempering furnace for a tempering process. Thus, the manufacturing method for a steel gear according to the first embodiment reduces the amount of $CO_2$ emissions and is friendly to the global environment in dispensing with using fire and oil and reducing the heat treatment time compared to the manufacturing method for a steel gear according to the related art which includes the "carburizing/oil quenching process". In addition, the heat treatment line can be shortened. Therefore, a compact manufacturing line for a steel gear can be constructed.

The manufacturing method for a steel gear according to the first embodiment was performed as described below using the heat treatment apparatus described above. That is, as indicated by the heat pattern A of FIG. 3A, the manufacturing method according to the example specifically included: the carburizing step a1 in which a prepared steel gear material was subjected to a carburizing process in a decompressed carburizing gas, the pressure of which had been reduced to be lower than the atmospheric pressure; the cooling step a2, subsequent to the carburizing step a1, in which the steel gear material was cooled in a cooling gas, the pressure of which had been reduced to be lower than the atmospheric pressure; and the quenching step a3 in which the cooled steel gear material was heated again through high-frequency induction heating and thereafter water-quenched.

The carburizing step a1 was performed as a carburizing process including a carburizing period and a diffusion period by keeping the steel gear material at a temperature of 950° C., which was the austenitizing temperature or more, for 80 minutes. In this event, the decompressed carburizing chamber was decompressed to 1 to 3.5 hPa, and acetylene was used as the carburizing gas.

The cooling in the cooling step a2 was performed through decompressed slow cooling. In this event, the cooling was performed under a decompression condition at 600 hPa. Nitrogen ($N_2$) was used as a cooling atmosphere gas. The cooling rate for the steel gear material was set in the range of 0.1 to 3.0° C./second during a period over which the temperature was reduced from the temperature which was the austenitizing temperature or more immediately after the carburizing process to a temperature of 150° C. which was lower than the A1 transformation point.

As shown in FIG. 3A, the quenching step a3 included a temperature raising step a31 in which the tooth-shaped surface side of the outer peripheral ring portion 2 in the steel gear material was heated through high-frequency induction heating to a temperature equal to or more than the austenitizing temperature, and a subsequent rapid cooling step a32 in which water was injected for water quenching so that a cooling rate equal to or more than a rapid-cooling critical cooling rate at which martensitic transformation is caused in the carburized layer 4 was easily obtained.

The temperature raising step a31 was performed over a relatively long time of 20 seconds by inputting a small amount of energy compared to conditions for normal high-frequency induction heating. Meanwhile, the rapid cooling step a32 was performed over 11 seconds at a cooling rate of 60 to 80° C./second.

Figure 4:
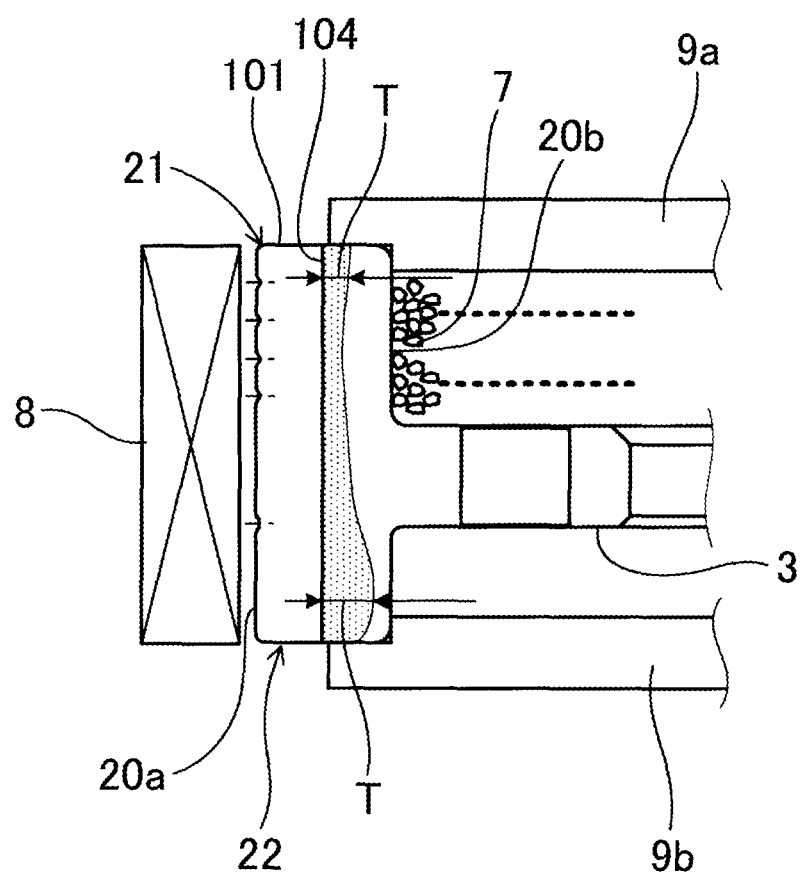
FIG. 4 illustrates a state during high-frequency induction heating in the manufacturing method for a steel gear according to the first embodiment.

In this event, the tooth-shaped surface side of the outer peripheral ring portion 2 was heated with the distal-end portion of the first projecting portion 21 of the outer peripheral ring portion 2 and the distal-end portion of the second projecting portion 22 held by jigs 9a and 9b, respectively, as shown in FIG. 4. The jigs 9a and 9b deprived the distal-end portions of heat so that fusion of the distal-end portions due to overheating was conveniently avoided.

A coil 8 of a high-frequency induction heating unit had the same width in the axial direction as that of the steel gear material, and was provided opposite to the outer peripheral surface 20a on which the toothed shape 10 was formed with a space therebetween. The spacing was 2 mm. It should be noted, however, that it is difficult to adjust the heating depth T through high-frequency induction heating in the inward direction from the tooth bottom 104 of the toothed shape 10 on the outer peripheral surface 20a so as to be larger at the second projecting portion 22 than at the first projecting portion 21 by performing high-frequency induction heating in this state. Therefore, in the example, as shown in FIG. 4, the inner peripheral surface 20b side of the first projecting portion 21 was positively cooled through water cooling 7 during high-frequency induction heating. Although the inner peripheral surface 20b side of the first projecting portion 21 was cooled through the water cooling 7 in the example, the inner peripheral surface 20b side of the first projecting portion 21 may also be cooled through air cooling. Alternatively, the coil 8 may be disposed to be displaced toward the second projecting portion 22 in the axial direction by about 1 to 2 mm for adjustment.

By cooling during high-frequency induction heating, the heating depth T through high-frequency induction heating in the inward direction from the tooth bottom 104 of the toothed shape 10 on the outer peripheral surface 20a was adjusted so as to be larger at the second projecting portion 22 than at the first projecting portion 21. More specifically, defining the heating depth through high-frequency induction heating in the inward direction from the tooth bottom 104 of the toothed shape 10 on the outer peripheral surface 20a as T, and defining the distance from the tooth bottom 104 of the toothed shape 10 on the outer peripheral surface 20a to the inner peripheral surface 20b as W, the heating depth through high-frequency induction heating was adjusted such that T/W at the second projecting portion 22 was larger than T/W at the first projecting portion 21. In this way, the steel gear 1 according to the first embodiment was manufactured, thereby the steel gear 1 according to the first embodiment was obtained.

Figure 5:
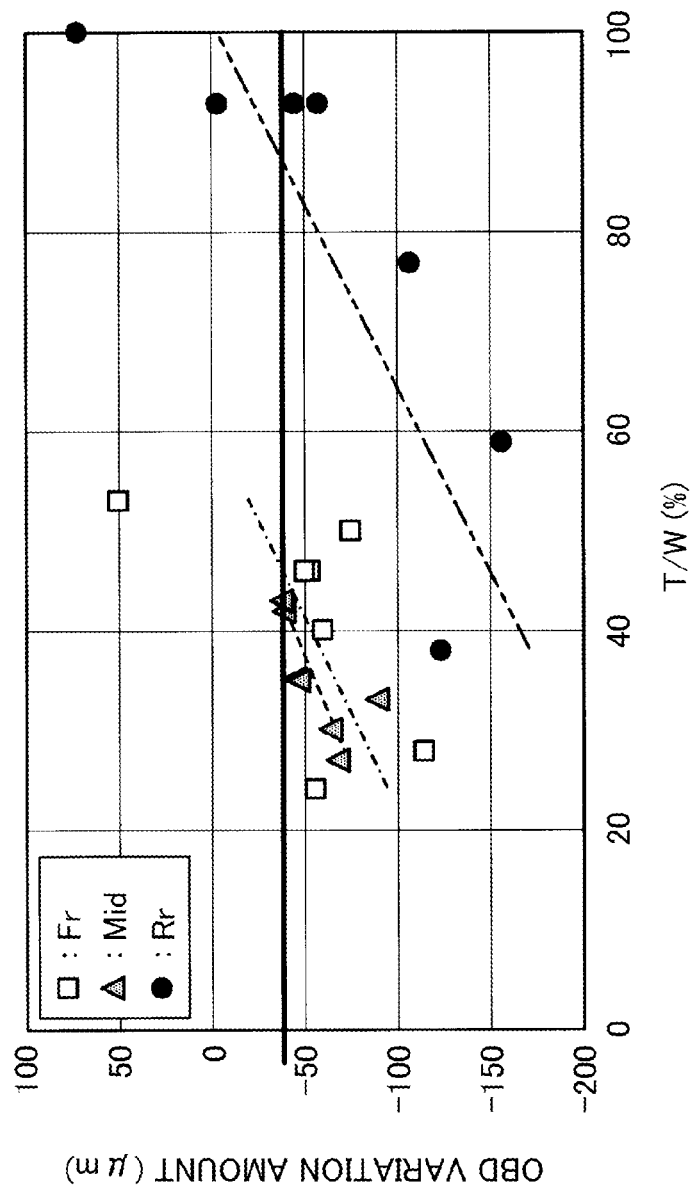
FIG. 5 illustrates the relationship between T/W (%) and the OBD variation amounts according to the embodiment.

Here, in the quenching step a3, the heating depth T through high-frequency induction heating in the inward direction from the tooth bottom 104 of the toothed shape 10 on the outer peripheral surface 20a was adjusted so as to be larger at the second projecting portion 22 than at the first projecting portion 21 on the basis of the following test results. In FIG. 5, the OBD variation amounts (μm) at predetermined positions of the outer peripheral ring portion 2 are plotted with T/W (%) adjusted to various values by variously changing the heating conditions during high-frequency induction heating.

The predetermined positions of the outer peripheral ring portion 2 include a position 3 mm inward toward the flange portion 3 from the distal-end portion of the first projecting portion 21 (hereinafter referred to as Fr position), a position at the center of the outer peripheral ring portion 2 in the axial direction (the midpoint of the tooth width) (hereinafter referred to as Mid position), and a position 3 mm inward toward the flange portion 3 from the distal-end portion of the second projecting portion 22 (hereinafter referred to as Rr position). The OBD variation amounts were calculated from the difference between the OBD value at each of the predetermined positions of the steel gear 1 after the quenching step a3 and the OBD value at each of the predetermined positions of the steel gear material after the cooling step a2. As shown in FIG. 1, the OBD value is the average value of measurement values obtained by inserting balls OB1 and OB2 in two tooth grooves located opposite to each other and measuring the overall outside diameter at each position using a dedicated OBD measuring instrument.

As seen from FIG. 5, there is a correlation between T/W (%) and the OBD variation amounts (μm). In order to make the respective OBD variation amounts at the Fr position and the Rr position approximately equal to each other, in addition, it is seen that T/W at the Rr position may be made larger than T/W at the Fr position. That is, it is seen from the test results that a steel gear 1 with a small OBD taper can be obtained by adjusting the heating depth through high-frequency induction heating such that T/W at the second projecting portion 22 is larger than T/W at the first projecting portion 21. In addition, in order to make the OBD variation amounts constant (for example, the horizontal line in the drawing), it is seen that T/W at the first projecting portion 21 is preferably adjusted to the range of 30 to 60%, more preferably 35 to 55%, further preferably 40 to 50%. Meanwhile, it is seen that T/W at the second projecting portion 22 is preferably adjusted to the range of 75 to 95%, more preferably 80 to 90%.

Figure 6:
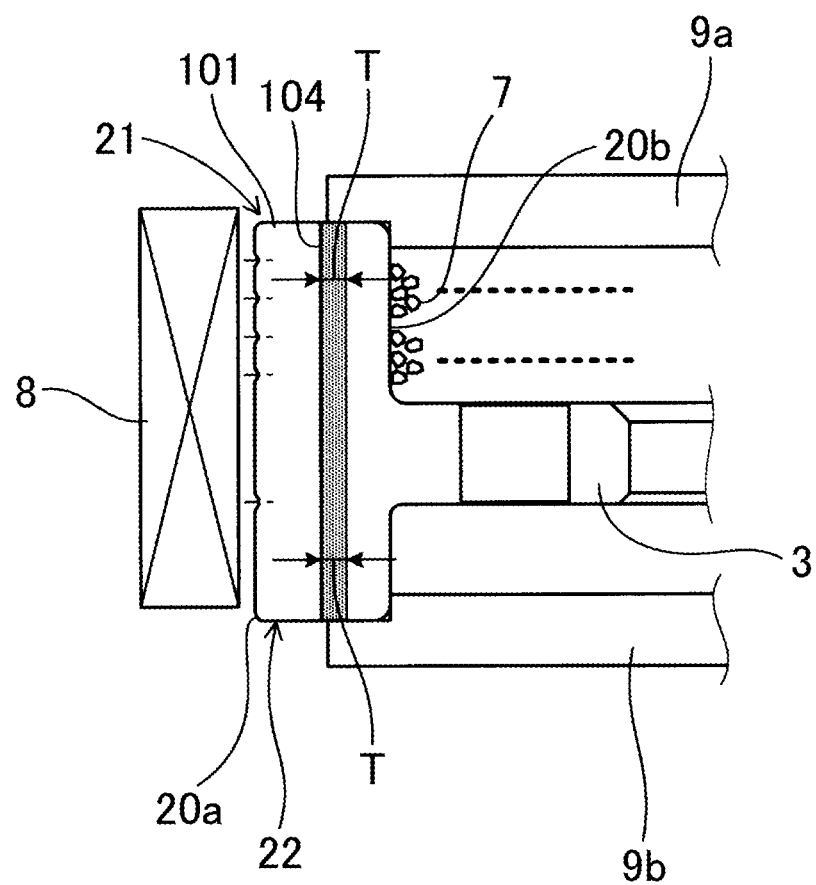
FIG. 6 illustrates a state during high-frequency induction heating in a manufacturing method for a steel gear according to a comparative example 1.

As a comparative example of the manufacturing method for the steel gear 1 according to the first embodiment, a steel gear according to a comparative example 1 was manufactured in the same manner as the manufacturing method for the steel gear 1 according to the first embodiment discussed above except that the heating depth T through high-frequency induction heating in the inward direction from the tooth bottom 104 of the toothed shape 10 on the outer peripheral surface 20a was adjusted so as to be substantially equal between the first projecting portion 21 and the second projecting portion 22, and then the steel gear according to the comparative example 1 was obtained. In this event, the heating depth T was specifically adjusted during high-frequency induction heating by shifting the position of the coil 8 toward the first projecting portion 21 in the axial direction by 1 to 2 mm and making the water cooling 7 performed on the inner peripheral surface 20b side of the first projecting portion 21 less than that according to the first embodiment as shown in FIG. 6.

Figure 7:
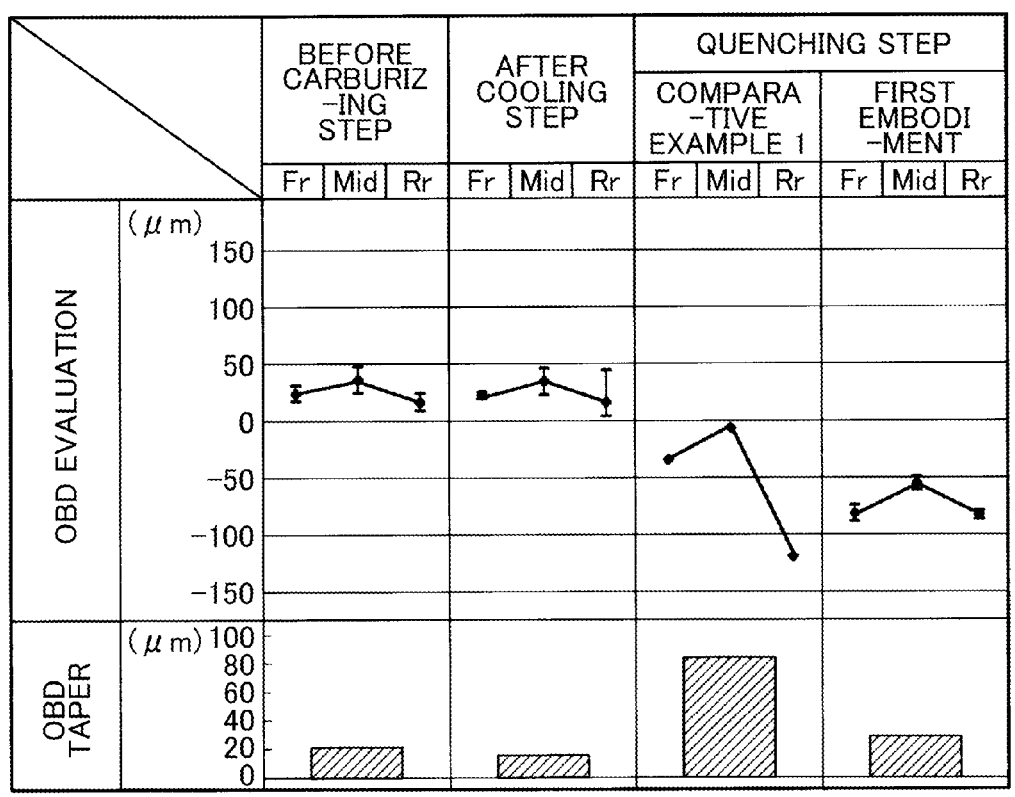
FIG. 7 illustrates a state of occurrence of distortion of steel gear materials after each process in the manufacturing methods for a steel gear according to the first embodiment and the comparative example 1, and of the steel gears according to the first embodiment and the comparative example 1.

Next, a state of occurrence of distortion of the steel gear materials after each process in the manufacturing methods for a steel gear according to the first embodiment and the comparative example 1, and of the steel gears according to the first embodiment and the comparative example 1 obtained by such manufacturing methods, was examined. The results are shown in FIG. 7. The OBD values of FIG. 7 were measured in the method discussed above. An OBD taper is the absolute value of the difference between the OBD value at the Fr position and the OBD value at the Rr position. In each column of FIG. 7, the maximum value, the minimum value, and the average value are plotted for the three locations, namely the Fr position, the Mid position, and the Rr position, with the maximum value and the minimum value connected to each other by a line. In addition, the average values for the three locations are also connected to each other by a line.

As seen from FIG. 7, the comparative example 1 only resulted in a steel gear having poor dimensional accuracy and being distorted into a shape with a large OBD taper. In contrast, it is seen that the first embodiment resulted in a steel gear having high dimensional accuracy and a shape with a small OBD taper. This is estimated to be because of the following reasons.

In the case where the heating depth T through high-frequency induction heating in the inward direction from the tooth bottom 104 is adjusted so as to be uniform over the entire outer peripheral ring portion 2 in the axial direction as in the comparative example 1 shown in FIG. 8, the following mechanism is conceivable. That is, the first projecting portion 21 is farther from the coupling position with the flange portion 3, and therefore bound by the flange portion 3 with a small force compared to the second projecting portion 22. On the other hand, the second projecting portion 22 is closer to the coupling position with the flange portion 3, and therefore bound by the flange portion 3 with a large force compared to the first projecting portion 21. Therefore, it is considered that the distal-end portion side of the first projecting portion 21 is significantly deformed radially outward through thermal expansion (arrow R1), and that the distal-end portion side of the second projecting portion 22 is less deformed radially outward through thermal expansion (arrow R2) than the distal-end portion side of the first projecting portion 21. In addition, it is also considered that the flange portion 3 is slightly plastically deformed by deformation of the first projecting portion 21 and the second projecting portion 22 through thermal expansion. Then, when cooling is performed through quenching in this state, the first projecting portion 21 and the second projecting portion 22 are deformed radially inward (arrow r1 and arrow r2). In this event, it is considered that the comparative example 1 resulted in a steel gear distorted into a shape with a large OBD taper because of the difference in magnitude of the amount of deformation during high-frequency induction heating.

In the case where the heating depth T through high-frequency induction heating in the inward direction from the tooth bottom 104 is adjusted so as to be larger at the second projecting portion 22 than at the first projecting portion 21 as in the first embodiment shown in FIG. 9, in contrast, the following mechanism is conceivable. That is, it is considered that the distal-end portion side of the second projecting portion 22, which was less easily deformed during high-frequency induction heating than the distal-end portion side of the first projecting portion 21 when the heating depth T was uniform as shown in FIG. 8, is deformed to approximately the same degree as the distal-end portion side of the first projecting portion 21 (arrow R1 and arrow R2) because of the adjustment of the heating depth T described above. In addition, it is also considered that the flange portion 3 is slightly plastically deformed by deformation of the first projecting portion 21 and the second projecting portion 22 through thermal expansion. Then, when cooling is performed through quenching in this state, the first projecting portion 21 and the second projecting portion 22 are deformed radially inward (arrow r1 and arrow r2). In this event, it is considered that the first embodiment resulted in a steel gear in a shape with a small OBD taper because of the fact that the first projecting portion 21 and the second projecting portion 22 were deformed in approximately the same amount as each other during high-frequency induction heating.

Next, the steel gear according to the first embodiment was cut along the tooth bottom 104 of the toothed shape 10 to observe the metal structures in the cut surface. Specifically, the cut surface was corroded with an alcohol solution containing 3 to 5% of nitric acid, and observed using an optical microscope. FIGS. 10A to 10D show a photograph of the cut surface of the steel gear according to the first embodiment, and photographs of the metal structures. It is found from the cut surface that the carburized layer 4 is formed in the surface layer of the tooth bottom 104 as shown in FIG. 10D. As shown in FIG. 10A, the carburized layer 4 mainly has a martensite structure.

In addition, it is found from the cut surface that there is a layer provided in a region including the carburized layer 4 and at a depth, in the inward direction from the outer peripheral surface 20a of the outer peripheral ring portion 2 (in this case, the tooth bottom 104), larger than the depth of the carburized layer 4, and that the depth of the layer is different between the first projecting portion 21 and the second projecting portion 22 and larger at the second projecting portion 22 than at the first projecting portion 21. It is also found that the depth of the layer reaches its peak generally at the center portion of the second projecting portion 22 in the axial direction. It is further found that the layer is different in coloring from a portion located internally of the layer with a boundary line provided therebetween. When the metal structure was examined for a region between the outer peripheral surface 20a of the outer peripheral ring portion 2 and the boundary line but other than the carburized layer 4, it was found that the metal structure mainly had a ferrite structure and a martensite structure as shown in FIG. 10B. In the example, the layer corresponds to the thermal history layer 5. The depth of the thermal history layer 5 was about 3.5 mm at the Fr position, about 3.3 mm at the Mid position, and about 7.2 mm at the Rr position.

Figure 10C:
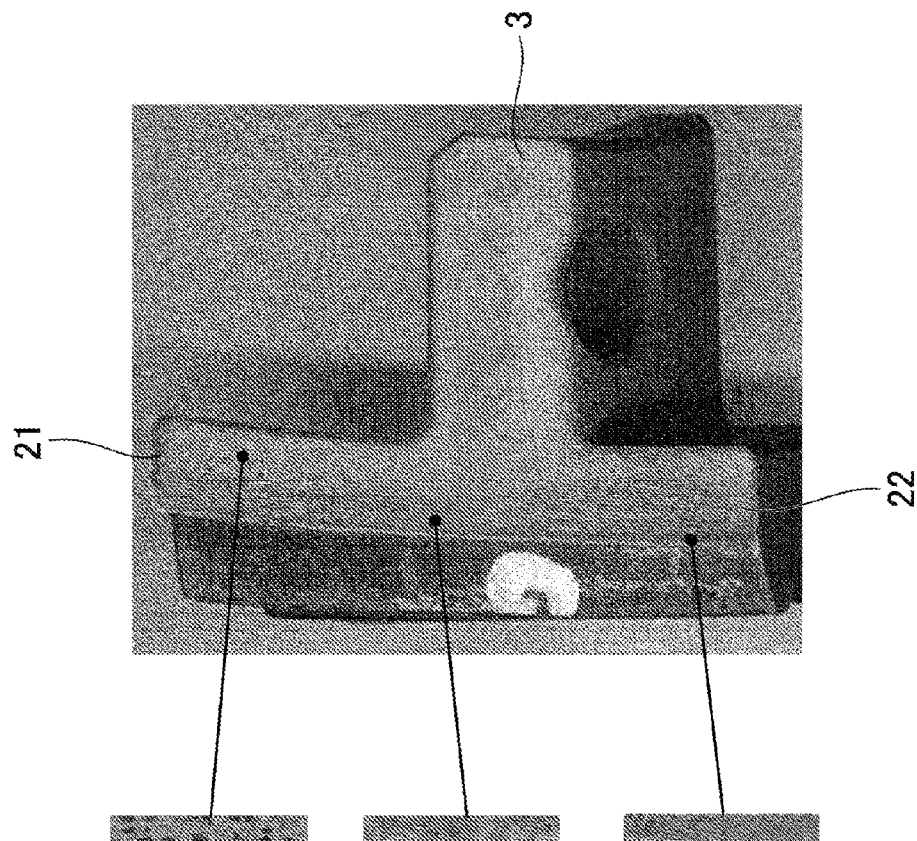
Figure 10B:
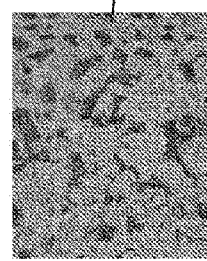
Figure 10A:
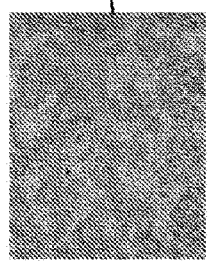
Figure 10D:
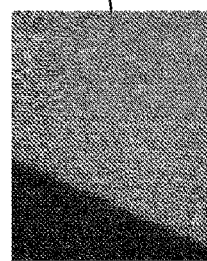

In addition, it was found that the portion located internally of the thermal history layer 5 mainly had a ferrite structure and a pearlite structure as shown in FIG. 10C. From the results described above, it can be said that the thermal history layer 5 has a history of being heated through high-frequency induction heating until becoming austenite, and that the portion located internally of the thermal history layer has not been heated through high-frequency induction heating until becoming austenite. It is considered that the boundary line can be observed as described above because of differences in metal structure, grain size, etc. between a portion located outwardly of the boundary line and a portion located inwardly of the boundary line. In the example, in addition, the thermal history layer 5 includes a ferrite structure and a martensite structure. Therefore, it is found that the internal hardness of the steel gear 1 can be adjusted by adjusting the depth T of the thermal history layer 5 and the magnitude of T/W. The surface carbon concentration of the carburized layer 4 at a position 50 μm from the surface of the outer peripheral surface 20a was measured using an X-ray macroanalyzer. The surface carbon concentration was 0.6%.

Figure 11:
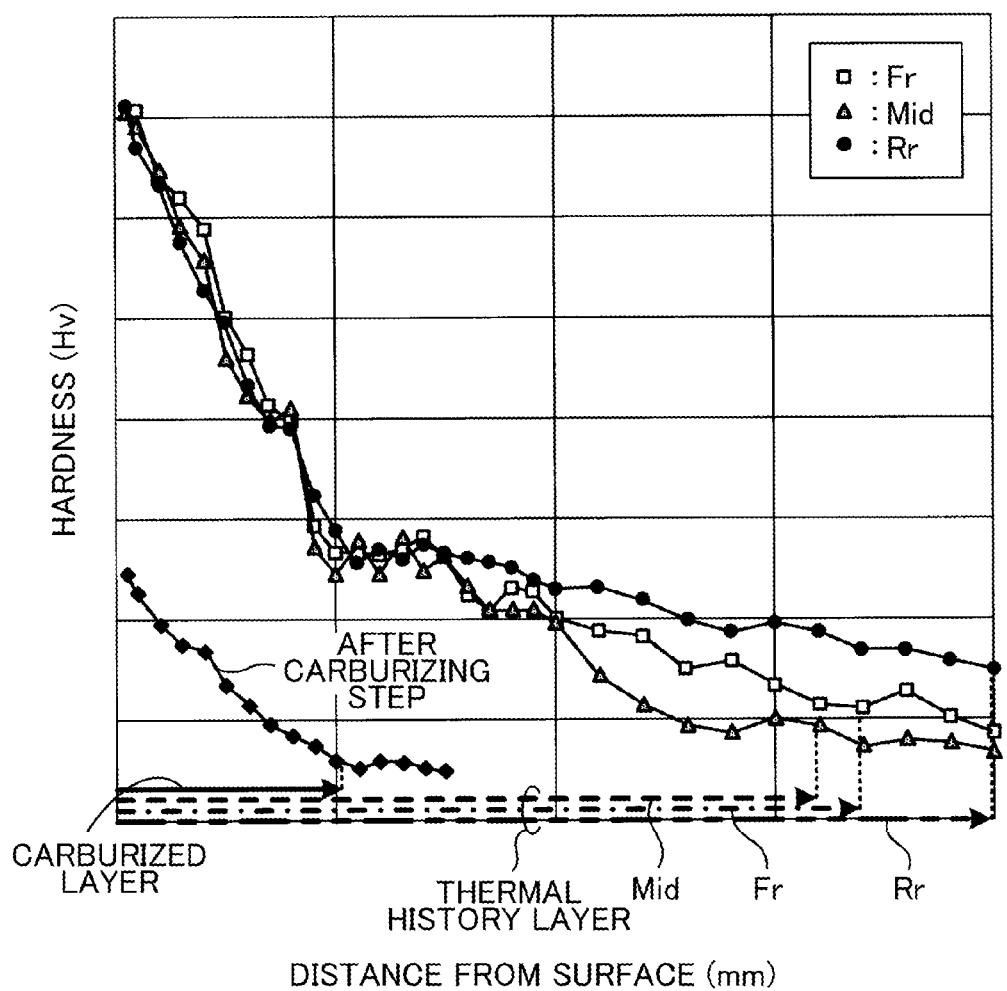
FIG. 11 illustrates the hardness distribution of the steel gear according to the first embodiment.

Next, the hardness distribution of the steel gear according to the first embodiment was measured. Specifically, the Vickers hardness (Hv, with a test load of 0.3 kgf) of the steel gear according to the first embodiment with respect to the distance from the surface of the tooth bottom 104 was measured. The results are shown in FIG. 11. In FIG. 11, the depth of the carburized layer 4 and the respective depths of the thermal history layer 5 at the Fr position, the Mid position, and the Rr position are indicated by the arrows.

It is seen from FIG. 11 that the respective hardnesses at the Fr position, the Mid position, and the Rr position were substantially equal to each other up to the depth of the carburized layer 4, and that the tooth-shaped surface was provided with a uniform surface hardness. Meanwhile, it is seen that in the thermal history layer 5, the respective hardnesses at the Fr position, the Mid position, and the Rr position were substantially equal to each other in a portion on the surface side close to the carburized layer 4, but that there was a difference in hardness among the Fr position, the Mid position, and the Rr position in a deeper internal region. Thus, it can be said that the dimensional accuracy of the steel gear can be adjusted through high-frequency induction heating while the effective case hardening depth is secured by adjusting the depth T of the thermal history layer 5 and the magnitude of T/W.

While an embodiment of the present invention has been described above, the present invention is not limited to the embodiment described above, and may be altered variously without departing from the scope and spirit of the present invention.

The invention claimed is:

1. A steel gear comprising:

a generally cylindrical outer peripheral ring portion, on an outer peripheral surface of which a toothed shape is formed; and a flange portion provided to extend radially inward from an inner peripheral surface of the outer peripheral ring portion, wherein:

the outer peripheral ring portion includes a first projecting portion that projects toward one side in an axial direction with respect to a coupling position at which the first projecting portion is coupled to the flange portion, and a second projecting portion that projects toward the other side in the axial direction with respect to a coupling position at which the second projecting portion is coupled to the flange portion, an axial length of the first projecting portion being larger than an axial length of the second projecting portion;

the outer peripheral ring portion includes a carburized layer formed in a surface layer of the toothed shape, and a thermal history layer formed in a region including the carburized layer and at a depth, in an inward direction from the outer peripheral surface, larger than a depth of the carburized layer, the thermal history layer having a history of being heated through high-frequency induction heating until becoming austenite; and the depth of the thermal history layer at a tooth bottom of the toothed shape in a radial direction at the first projecting portion is larger than the depth of the thermal history layer at the second projecting portion.

2. The steel gear according to claim 1, wherein defining the depth of the thermal history layer in the radial direction from the tooth bottom of the toothed shape on the outer peripheral surface as T, and defining a distance from the tooth bottom of the toothed shape on the outer peripheral surface to the inner peripheral surface as W, T/W at the second projecting portion is larger than T/W at the first projecting portion.

3. The steel gear according to claim 1, wherein the outer peripheral ring portion is configured such that the carburized layer has a martensite structure, a portion of the thermal history layer excluding the carburized layer has a ferrite-martensite structure, and a portion located internally of the thermal history layer has a ferrite-pearlite structure.

4. The steel gear according to claim 2, wherein the outer peripheral ring portion is configured such that the carburized layer has a martensite structure, a portion of the thermal history layer excluding the carburized layer has a ferrite-martensite structure, and a portion located internally of the thermal history layer has a ferrite-pearlite structure.

* * * * *